United States Patent
Pahlevani

(10) Patent No.: US 9,014,660 B2
(45) Date of Patent: Apr. 21, 2015

(54) MOBILE ALERT REPORTING AND MONITORING SYSTEMS AND METHODS

(71) Applicant: LiveSafe, Inc., Arlington, VA (US)

(72) Inventor: Ehsan Pahlevani, Washington, DC (US)

(73) Assignee: Livesafe, Inc., Arlington, VA (US)

( * ) Notice: Subject to any disclaimer, the term of this patent is extended or adjusted under 35 U.S.C. 154(b) by 165 days.

(21) Appl. No.: 13/752,629

(22) Filed: Jan. 29, 2013

(65) Prior Publication Data

US 2013/0196614 A1 Aug. 1, 2013

Related U.S. Application Data

(60) Provisional application No. 61/591,964, filed on Jan. 29, 2012.

(51) Int. Cl.
*H04M 11/04* (2006.01)
*H04W 4/22* (2009.01)

(52) U.S. Cl.
CPC ..................... *H04W 4/22* (2013.01)

(58) Field of Classification Search
None
See application file for complete search history.

(56) References Cited

U.S. PATENT DOCUMENTS

| | | | |
|---|---|---|---|
| 6,839,552 B1 | 1/2005 | Martin | |
| 7,406,507 B2 | 7/2008 | Piccioni | |
| 7,860,222 B1 | 12/2010 | Sidler et al. | |
| 7,924,149 B2 | 4/2011 | Mendelson | |
| 8,024,330 B1 | 9/2011 | Franco et al. | |
| 2006/0015254 A1* | 1/2006 | Smith | 702/3 |
| 2011/0130636 A1* | 6/2011 | Daniel et al. | 600/301 |
| 2011/0225198 A1* | 9/2011 | Edwards et al. | 707/780 |

* cited by examiner

*Primary Examiner* — Erika A Washington
(74) *Attorney, Agent, or Firm* — Jason H. Vick; Sheridan Ross, PC

(57) ABSTRACT

Computerized systems and methods may be used to enable users to report crimes, safety hazards or other perceived problems to the appropriate authorities via an alert. Such alerts may be communicated to the authorities through any suitable communication method such as, for example, phone calls, email and/or SMS text messages. In some example embodiments, the reporting system includes a computing device including, but not limited to, a mobile smartphone, tablet device, laptop computer, or desktop computer programmed with a software application.

10 Claims, 7 Drawing Sheets

MOBILE ALERT REPORTING AND MONITORING SYSTEMS AND METHODS

CROSS-REFERENCE TO RELATED APPLICATIONS

This application claims the benefit of U.S. Provisional Patent Application Ser. No. 61/591,964, filed on Jan. 29, 2012, which is fully incorporated herein by reference.

TECHNICAL FIELD

The present invention relates to a reporting and monitoring system using mobile computing devices and, more particularly, to a system and method for alerting authorities to and monitoring crimes, safety hazards or other perceived problems.

BACKGROUND INFORMATION

While investigative and monitoring technologies have improved in recent years, evidence and information obtained from bystanders and other witnesses remain critical tools for law enforcement, safety, school and other officials. Additionally, when such information is obtained from bystanders, the monitoring of the bystander reports provides such officials with another tool to combat crime and locate hazards. Unfortunately, crimes and safety hazards often go unreported by these important witnesses for various reasons including, for example, time pressure, desire to avoid police interaction, self preservation and protection, etc. A need, therefore, exists for a method and/or system for increasing bystander reporting.

In general, computing devices, such as mobile smartphones and laptop computers, may include various image, audio and video collection systems. One way to increase bystander reporting is by using a computing device to capture images, audio and video and sending the package of information to authorities in order to provide them with a better understanding of the situation. Conventional mobile smartphones often require several applications to capture images, audio and video and to send information and do not include an application that integrates these functions for reporting and monitoring crimes, safety hazards, or other perceived problems.

SUMMARY

To address the needs discussed above, the described embodiments provide methods and systems allowing users to report crimes, safety hazards or other perceived problems and send them to an alert report database so that a plurality of users are able to monitor such crimes, safety hazards or other perceived problems. In some example embodiments, the reporting system includes a computing device including, but not limited to, a mobile smartphone, tablet device, laptop computer or desktop computer programmed with a software application and a host computer system.

According to one embodiment of the crime and safety reporting and monitoring method, a preferred incident database is established comprising user identifying information and any information provided regarding the crime, safety hazard or other perceived problem. A crime and alert report database may be created on a host computer system, the crime and alert report database including a plurality of alert reports including alert reporter information, alert information, and alert data. A report map may also be created on the host computer system, the report map including the plurality of alert reports plotted according to geographic location. The host computer system then provides access, via the report map displayed on a user mobile computer system, to the alert reporter information, the alert information and the alert data, wherein the report map enables a plurality of alert reporters to contribute to an alert report.

One exemplary embodiment consistent with the present invention relates to a method for bystander reporting. The bystander reporting and monitoring system includes a user via a user application creating an alert report on the create alert screen with the user application being configured to send alert reporter information and alert information associated with a new alert report from a user mobile computer system to a host computer system. The user application sends the alert reporter information and alert information from the user to the host computer system, wherein the sent alert reporter information and alert information is associated with the new alert report. The host computer system receives the alert report from the user with alert reporter information and alert information provided by the user via the user application. The host computer system stores the alert reporter information and alert information via an alert report database. The user may capture streaming video, audio clips, video clips or pictures via a capture alert data screen and sends the alert data captured by the user to the host computer system, wherein the sent alert data is associated with the new alert report. After receiving the alert data from the user, the host computer system stores the alert data via the alert report database and provides access to the alert report database and an alert report map, wherein the user, via user application, can access the sent alert report and the report map enables a plurality of alert reporters to contribute to the new alert report.

Another exemplary embodiment consistent with the present invention relates to a system for bystander monitoring. The system for bystander monitoring includes a user computing device, which includes systems to capture images, audio and/or video and send such information to another computing device. The host computer system provides access to an alert report map and is displayed on a user mobile computer system via a user application, wherein the alert report map enables a plurality of alert reporters to contribute to an alert report. The alert report map allows the user to select an alert report located on the alert report map. After selecting an alert report, an update alert screen is displayed via the user application where the user application is configured to send alert reporter information and alert information associated with the alert report from a user mobile computer system to a host computer system.

After receiving an updated alert report from the user with updated alert reporter information and updated alert information provided by the user via the user application, the host computer system stores the updated alert reporter information and updated alert information via an alert report database. A capture alert data screen is displayed to the user via the user application, the user application being configured to send alert data from the user mobile computer system to the host computer system. The updated alert data captured by the user is sent to the host computer system, wherein the sent updated alert data is associated with the alert report. The host computer system receives the updated alert data from the user wherein the sent updated alert data is associated with the alert report and stored via an alert report database. The host computer system then provides access to the alert report database and report map, wherein the user, via user application, can access the sent alert report and the report map enables a plurality of alert reporters to contribute to the alert report.

BRIEF DESCRIPTION OF THE DRAWINGS

These and other features and advantages will be better understood by reading the following detailed description, taken together with the drawings wherein.

DETAILED DESCRIPTION

The computerized systems and methods, consistent with embodiments of the present invention described herein, enable mobile crime and alert reporting. Mobile crime and alert reporting may be enabled by allowing multiple users to report incidents and crimes and to send streaming video, video clips, pictures, and audio clips to authorities and other users. Users may be enabled to monitor existing reports and also contribute to the report with additional information or streaming video, video clips, pictures, and audio clips. If an alert is considered to be an emergency, mobile crime and alert reporting may be enabled by sending the alert to the nearest authorities based on the location of the user mobile computer system. Although a crime and alert reporting system and method is described herein, the systems and methods described herein are not limited to reporting crimes and may be used to report other incidents or events, which may or may not be crimes.

As used herein, an "alert report" refers to a report of a crime, incident, or hazard and includes the information of the reporter, information of the crime, incident, or hazard, and alert data pertaining to the crime, incident, or hazard. "Alert reporter information" refers to the user's personal and/or identifying information such as, for example, name, e-mail address, telephone number, address, emergency contact information, medical contact information, and geographic location. "Alert information" refers to any information describing the crime, incident, or hazard such as, for example, geographic location, text descriptions, and whether or not the alert is an emergency. An "alert data" refers to any data files or clips associated with the crime, incident, or hazard that is uploaded such as, for example, streaming video, video clips, pictures, and audio clips.

Figure 1:
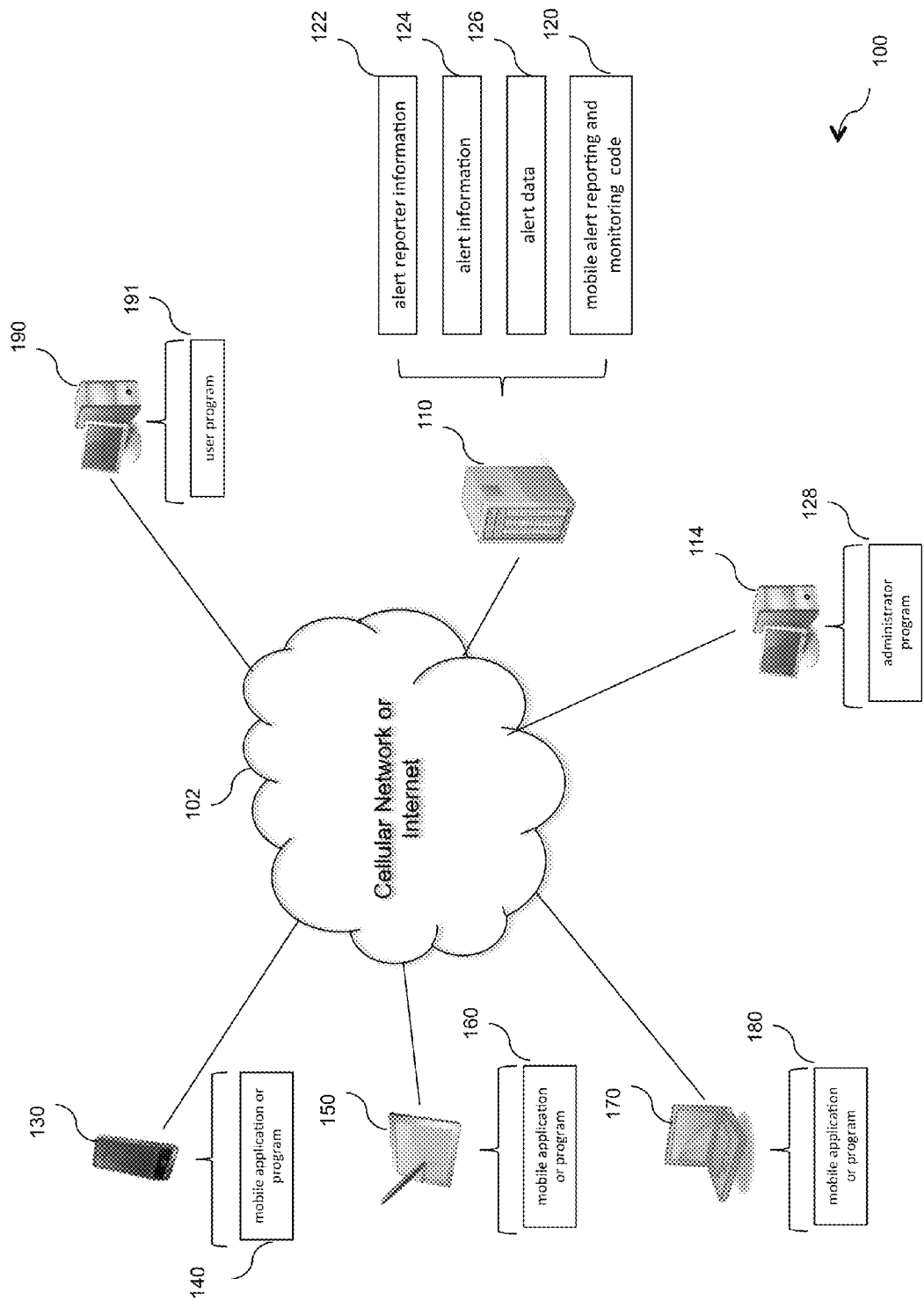
FIG. 1 is a diagrammatic view of a crime or alert reporting network, consistent with an embodiment of the present invention.

Referring to FIG. 1, a mobile alert reporting and monitoring system 100 may be used to establish a network of users who access the system 100 over a network 102 such as the Internet or any cellular network by way of cellular technology such as GSM (Global System for Mobile Communications), CDMA (Code Division Multiple Access), and AMPS (Advanced Mobile Phone System). Examples of these cellular networks include mobile communications standards such as 3G (e.g., UMTS, CDMA2000) and 4G (e.g., Mobile WiMAX, LTE). The system 100 allows the users to create new alert reports and also contribute to existing alert reports over the network 102 to alert each other and the closest authorities to potential dangers and other incidents.

The mobile alert reporting and monitoring system 100 may be implemented using a combination of hardware and software. The hardware may generally include a host computer system 110, mobile computer systems 130, 150, 170, and computer systems 114, 190. The host computer system 110 is a server that is used to store alert reports in the form of a database as well as a map. This host computer system 110 provides database and map access to computer systems 114, 130, 150, 170, and 190. Computer systems 130, 150, 170 are able to access the database and map on the host computer system by executing a mobile application or program 140, 160, 180 or a specialized interface that is installed on the computer systems 130, 150, 170. Computer system 190 is a computer system used by the authorities (e.g., police, campus safety) and is able to access the database and map on the host computer system by executing a program 191 that is purchased and installed on the computer system 190 or a web-based interface.

Examples of mobile computer system 130 include the iPhone® smartphone and any smartphone device running mobile operating systems such as Android®, iOS®, or Windows®. Examples of mobile computer system 150 include the iPad® tablet computer and any tablet computer device running mobile operating systems such as Android®, iOS®, or Windows®. Examples of mobile computer system 170 include a laptop PC or MAC® computer.

Examples of mobile computer system 130 use cell towers used for the cellular network and Wi-Fi Internet network locations to determine GPS (Global Positioning System) location of the device. Other examples of the geographic location system in mobile computer system 130 included A-GPS (Assisted GPS) and GLONASS global positioning system. Examples of mobile computer system 150 use cell towers used for the cellular network and Wi-Fi Internet network locations to determine GPS (Global Positioning System) location of the device as well. Other examples of the geographic location system in mobile computer system 150 included A-GPS (Assisted GPS) and GLONASS global positioning system. Computer systems 114, 170, 190 may not have a geographic location system and therefore would require the user to input a specific geographic location (e.g., latitude and longitude, street address).

Examples of mobile computer systems 130, 140, 170 may use the microphone installed on the device to capture audio and create a file of the recording. Examples of mobile computer systems 130, 140, 170 may use the camera installed on the device to capture photographs. In some mobile operating systems such iOS®, the devices has the capability to embed location data in the pictures, producing geocoded photographs. In addition to the audio recording capability and picture capture capability, examples of mobile computer systems 130, 140, 170 may use the microphone and camera installed on the device to record video. Computer systems 114, 190 may also use microphones or cameras installed on the device to capture audio, picture, and video.

The software may include code 120 for providing the functionality of the system and may include data generated and accessed by the system, such as alert reporter information 122, alert information 124, and alert data 126. Users may access the database and map that contain the alert report 122, 124, and 126 over the network 102. The application or program 128, 140, 160, 180, 191 executing on the computer systems or devices 114, 130, 150, 170, 190 can be used to enter alert reports to host computer system 110 and access the database and map. The software code 120 on the host computer system 110 may be executed to organize the new alert reports and to perform the processes, procedures or functions that enable mobile alert reporting and monitoring as described in greater detail below. As used herein, the terms process, procedure, and function are generally used interchangeably to refer to one or more actions performed by software being executed by a computer system to achieve a result. In particular, the application or program 128, 140, 160, 170, 191 may be executed to access or generate alert information 124 and to contribute to an alert report by uploading evidence stored as alert data 126. All or a portion of the applications or programs executed on the user computer systems or devices and the code on the host computer system may be written in any suitable programming language, for example, in a procedural programming language (e.g., "C") or an object-oriented programming language (e.g., "C++" or Java).

The host computer system 110 may be coupled to the network 102 and accessed by various user mobile computer systems 130, 150, and 170 coupled to the network 102, for example, by using the mobile application or computer program. The host computer system 110 may include one or more server computers such as a server running a network operating system and may include one or more databases such as database software running on the server computer(s) or separate database computer(s). Although the host computer system 110 is shown as a single server unit, the host computer system 110 may include a combination of computers or computing components.

The users may access the mobile alert reporting system 100 using the computer systems 130, 150, 170, and 190 that are connected to the network 102 and executing a mobile application or program 140, 160, 180 or a specialized interface. The user computer systems may be the user's laptop PC or MAC® computer 170 or may be a mobile computing device 130 or tablet computing device 150. One example of the mobile computer device 130 is an iPhone® smartphone with a mobile alert reporting "app." When the mobile application or program 140, 160, 180 is executed, the user may be presented with sections that allow the user to enter information, enter a new alert report, and monitor or update an existing alert report, as described in greater detail below.

An administrator computer system 114 may be coupled to the network 102 and used by an administrator to access and administer the mobile alert reporting and monitoring system 100 through an administrator program 128 or web based interface. The administrator computer system 114 may be located at the same location as the host computer system 110 or located remotely.

Figure 2:
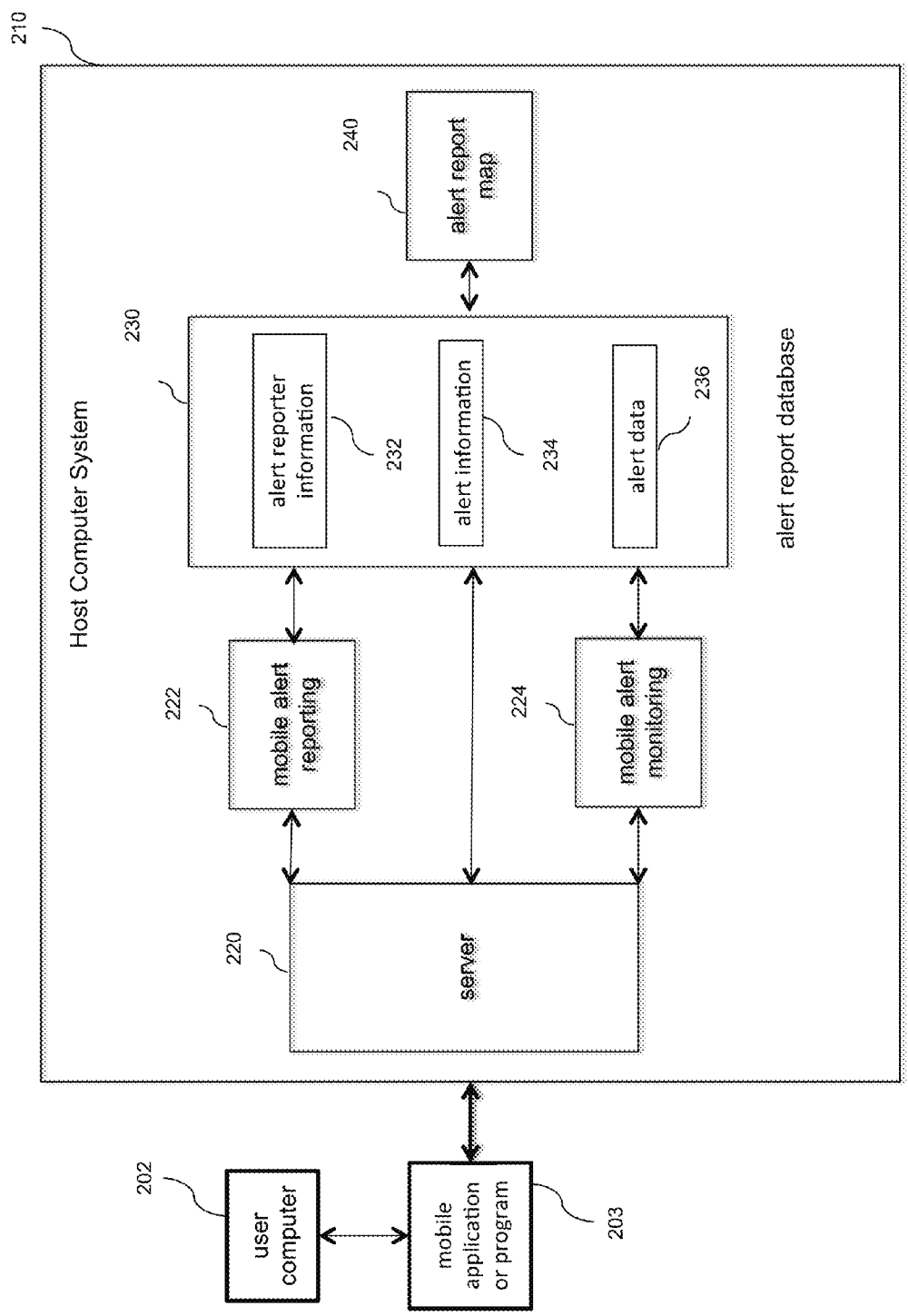
FIG. 2 is a diagrammatic view of a mobile alert reporting and monitoring system, consistent with an embodiment of the present invention.

Referring to FIG. 2, an embodiment of a mobile alert reporting and monitoring system 200 is described in greater detail. The mobile alert reporting and monitoring system 200 may include a host computer system 210 providing server code 220, mobile alert reporting code 222, mobile alert monitoring code 224, or any combination thereof. The server code 220 may be executed on the host computer system 210 to allow user computer system 202 access to the alert report database 230 and alert report map 240. The mobile alert reporting code 222 and mobile alert monitoring code 224 may include code executed on the host computer system 210 to perform at least some of the processes, procedures and/or functions associated with mobile alert reporting and monitoring.

Server code 220 may include instructions executed by the host computer system 210 to provide the user computer system 202 access to the alert report database 230 and alert report map 240. The alert report database 230 may be created using any suitable database software or techniques known to those skilled in the art, and the alert report map 240 may be created using any suitable mapping software or techniques known to those skilled in the art. Access provided to the user computer system 202 by the server code 220 allows the user computer system 202 to enter new alert reports by executing mobile alert reporting code 222 or update existing alert reports by executing mobile alert monitoring code 224. Both mobile alert monitoring code 222 and mobile alert monitoring code 224 interact with the alert report database 230 and alert report map 240. When the user computer 202 uses program 203 to interact with the host computer system 210, the server code 220 decides whether to provide access to the alert report database and alert report map to the user computer 202, execute mobile alert reporting code 222, or mobile alert monitoring code 224.

The server code 220 may decide to execute mobile alert reporting code 222. Mobile alert reporting code 222 may include instructions executed by the host computer system 210 to perform processes, procedures and/or functions involved with entering new alert reports to the alert report database and alert report map. The mobile application or program 203 may prompt the user to enter alert reporter information (e.g., name, e-mail address, telephone number, address, emergency contact information, medical contact information, and geographic location), alert information, and alert data. The mobile application or program 203 may then communicate with the host computer system 210. When the server code 220 determines that the alert report is new, server code 220 then executes mobile alert reporting code 222. Mobile alert reporting code 222 enters the alert report 232, 234, 236 into the alert report database 230 and the alert report map 240.

The server code 220 may decide to execute mobile alert monitoring code 224. Mobile alert reporting code 224 may include instructions executed by the host computer system 210 to perform processes, procedures and/or functions involved with updating existing alert reports, the alert report database and the alert report map. The mobile application or program 203 may prompt the user to enter alert reporter information (e.g., name, e-mail address, telephone number, address, emergency contact information, medical contact information, and geographic location), alert information, and alert data. The mobile application or program 203 may then communicate with the host computer system 210. When the server code 220 determines that the alert report is an update of an existing alert report, server code 220 then executes mobile alert monitoring code 224. Mobile alert reporting code updates the alert report 232, 234, 236 in the alert report database 230 and the alert report map 240.

The host computer system 210 may also store an alert report database 230 where the database includes alert reporting information 232, alert information 234, and alert data 236 of the alert reports created. The host computer system 210 may also store an alert report map 240 where the alert report database 230 is used to plot alert reports on a map based on the geographic information provided in the alert report.

Although the illustrated embodiment of the mobile alert reporting and monitoring system 200 includes the code 222 and 224 for performing all of the functions or processes, other embodiments of the system 200 may include code for performing only one or more of these functions in combination with the server 220. Although the code 222 and 224 is illustrated as discrete elements, these elements may not necessarily be executed as separate, discrete processes, procedures, or functions within the mobile alert reporting and monitoring system 200. The mobile alert reporting and monitoring system 200 may include other code and other types of data to facilitate other processes, procedures, functions and features described herein. The mobile alert reporting and monitoring system 200 may include, for example, code that allows integration or linking with other online digital media (e.g., embedding YouTube® videos) and/or with online social networking websites (e.g., Facebook®) to share alert reports with other users.

Figure 3:
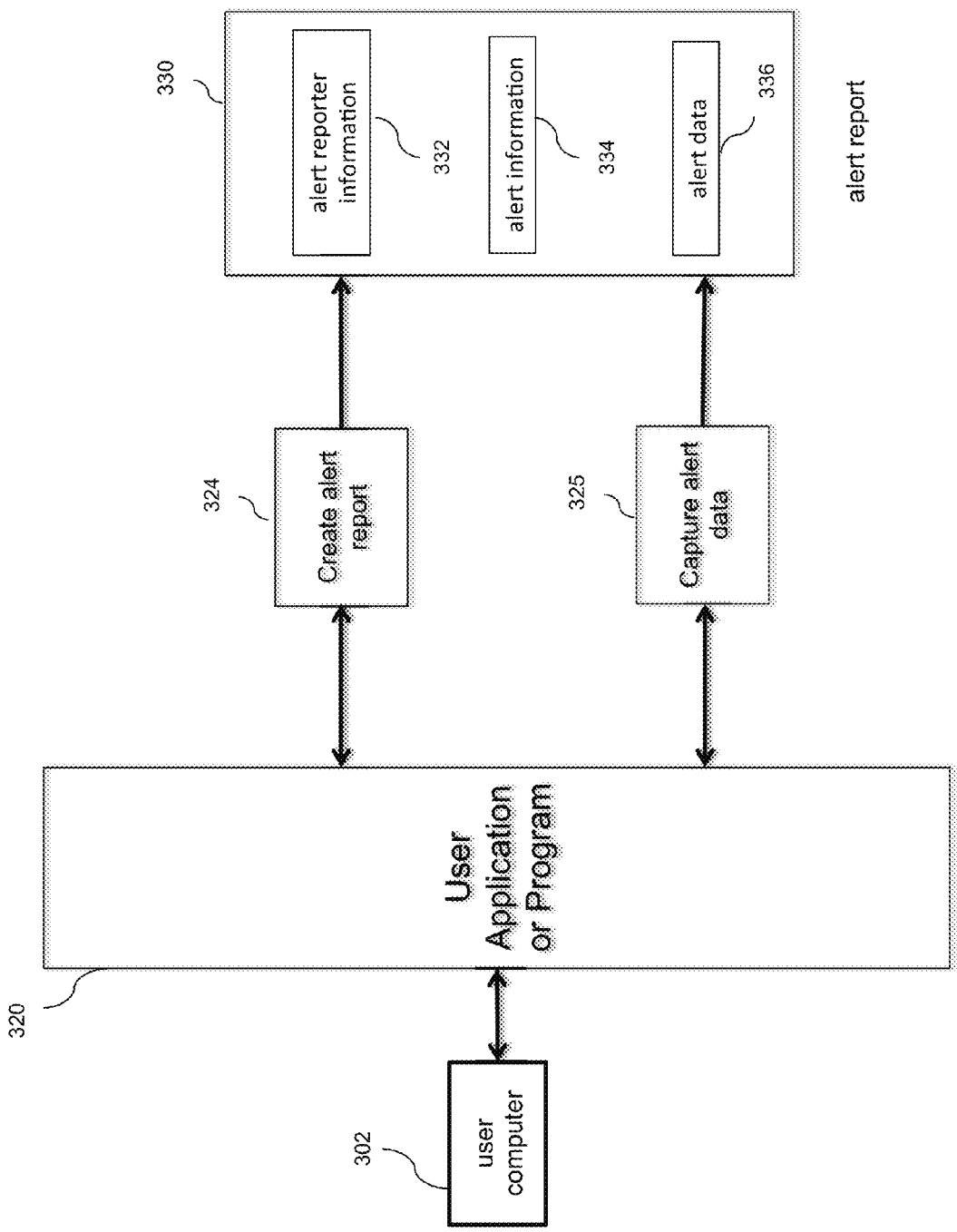
FIG. 3 is a functional block diagram of a system for creating an alert report, consistent with an embodiment of the present invention.

Referring to FIG. 3, one system and method for mobile alert reporting and monitoring involves creation of an alert report 330. A user application or program 320 installed on the user computer 302 executes a create alert report process 324 that prompts the user via the user interface to provide alert reporter information 332 and alert information 334 and an capture alert data process 325 that prompts the user via the user interface to capture alert data 336. The create alert report process 324 prompts a screen on the user computer 302 that allows the user to enter the alert reporter information 332 and alert information 334. Then the user application or program 320 executes the capture alert data process 325 that prompts a screen on the user computer 302 that allows the user to capture alert data 336 associated with the alert report 330. The user application or program 320 then sends the alert report 330 with the associated alert reporter information 332, alert information 334, and alert data 336 to the host computer system 110, 210. The alert report 330 can be accessed on the host computer system 110, 210 by any user with access via a user application or program 320.

Figure 4:
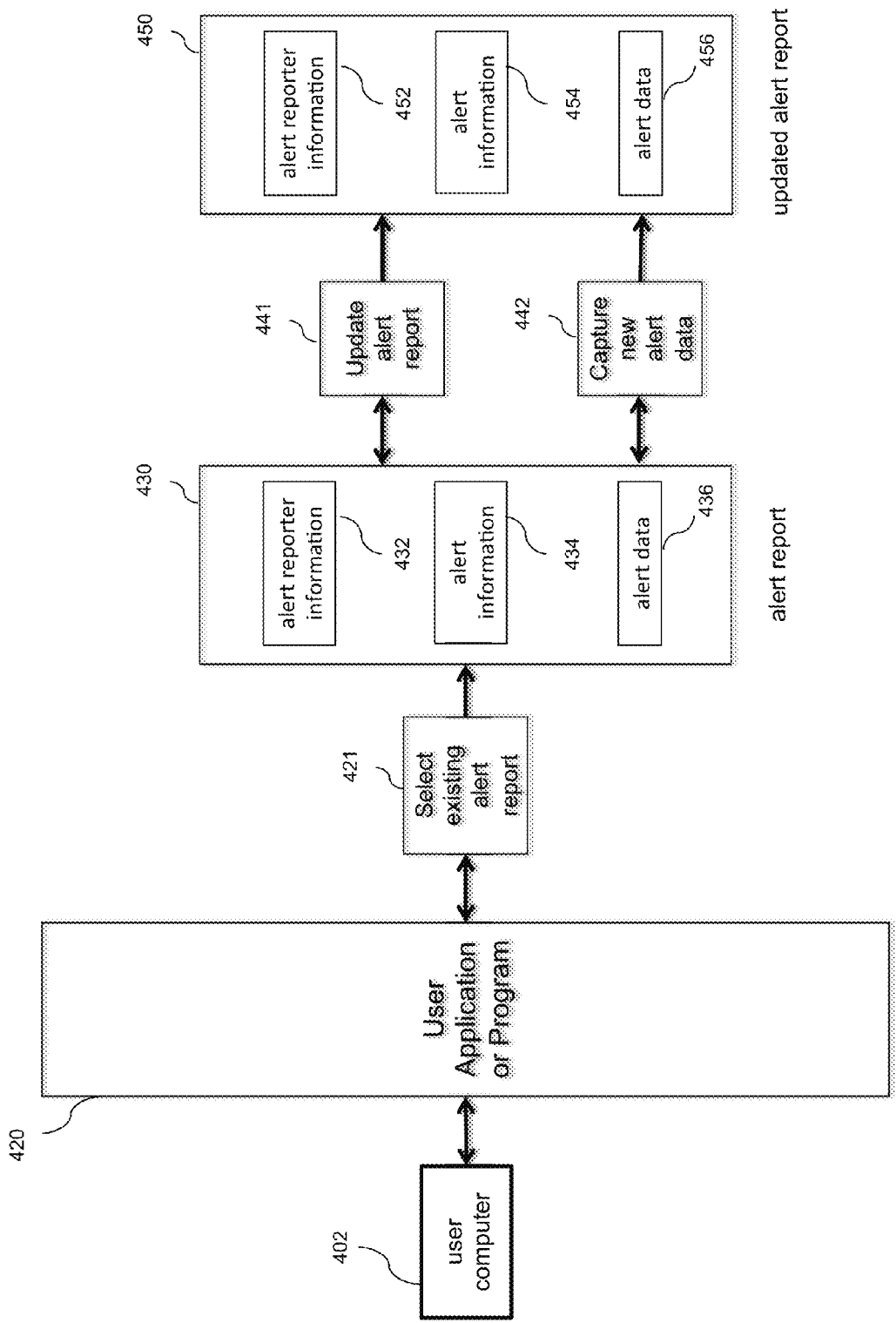
FIG. 4 is a functional block diagram of a system for monitoring an alert report, consistent with an embodiment of the present invention.

Referring to FIG. 4, another system and method for mobile alert reporting and monitoring involves enabling other users to monitor and contribute to an alert report 430. A user application or program 420 installed on the user computer 402 executes a select existing alert report process 421 that prompts the alert report map 240 created in the host computer system 110, 210 to be accessed by the user computer via user application or program. The select existing alert report process 421 prompts a screen that shows the alert report map 240 on the user computer 402. The alert report map 240 shows existing alert reports plotted according to geographic location information and the user can select an alert report 430 on the alert report map 240. Selecting an alert report on the alert report map 240 allows the user to access the alert report database and prompts a screen with the existing alert reporter information 432, alert information 434, and alert data 436.

Selecting an alert report on the alert report map 240 executes an update alert report process 441 that prompts the user via the user interface to provide alert reporter information 452 and alert information 454 and a capture new alert data process 442 that prompts the user via the user interface to capture alert data 456. The update alert report process 441 prompts a screen on the user computer 402 that allows the user to enter the alert reporter information 452 and alert information 454. The user application or program 420 executes the capture alert data process 442 that prompts a screen on the user computer 402 that allows the user to capture alert data 456 associated with the alert report 430. The user application or program 420 then sends the updated alert report 450 with the updated alert reporter information 452, updated alert information 454, and updated alert data 456 to the host computer system 110, 210. The alert report 450 can be accessed on the host computer system 110, 210 by any user with access via a user application or program 420.

Figure 5C:
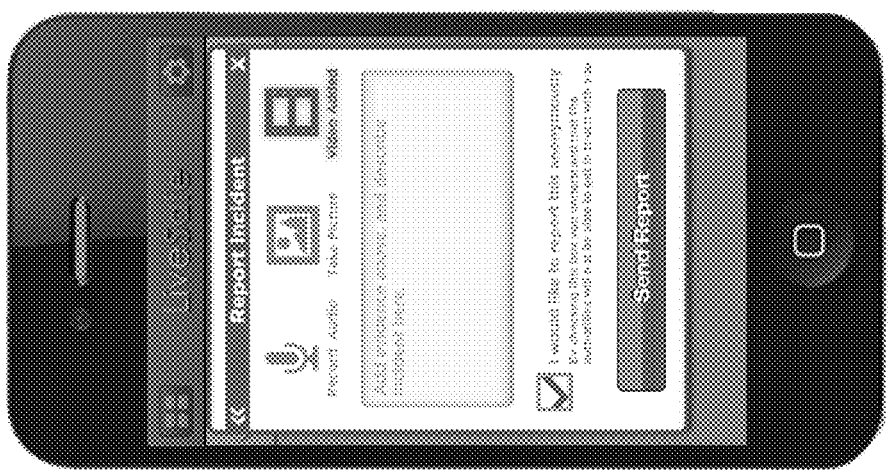
FIG. 5A-5C are screen shots illustrating a mobile alert reporting and monitoring system user application home screen, alert creation prompt, and alert creation screen, respectively, consistent with an embodiment of the present invention.
Figure 5B:
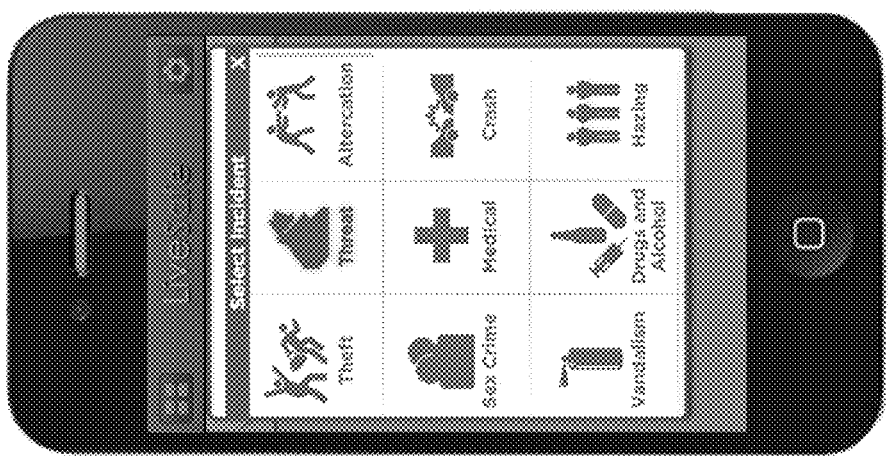
Figure 5A:
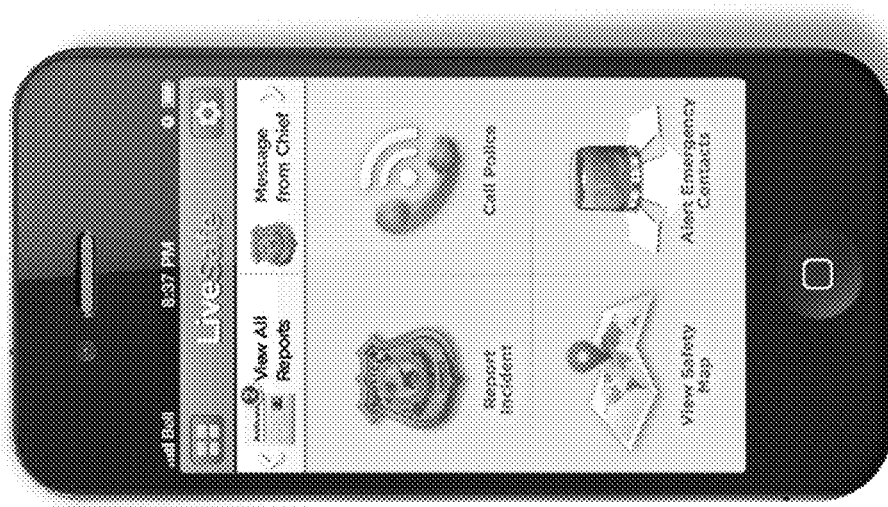

FIGS. 5A-5C show screen shots of one example of home screens of user application or programs generated by software code and displayed on a user computer system. The user application home screen shown in FIG. 5A allows a user to report an incident with alert reporter information. When the user selects the report incident icon on the home screen, a create alert screen is displayed as shown in FIG. 5B. The create alert screen allows a user to choose between different crimes and incidents that may be occurring, for example, by selecting an incident icon. When the incident is selected, the type of incident is automatically included in the alert information and a new alert report may be automatically generated and sent. The new alert report contains alert reporter information (e.g., pre-entered into the user application) and the alert information (e.g., the type of incident associated with the selected incident icon).

After the user selects the type of incident, the capture alert data screen is displayed as shown in FIG. 5C. The capture alert screen allows a user to enter in descriptive alert information and begin to capture and/or upload alert data associated with the alert report. The user may activate the buttons on the screen to upload different types of alert data to the alert report database to be associated with the alert report.

Figure 6B:
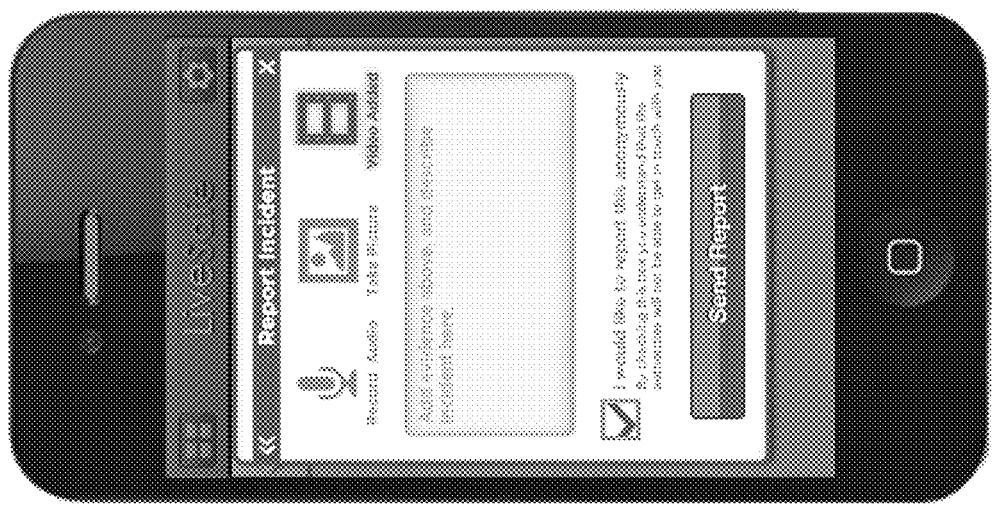
FIGS. 6A and 6B are screen shots illustrating an alert report screen and a create alert report screen, consistent with an embodiment.
Figure 6A:
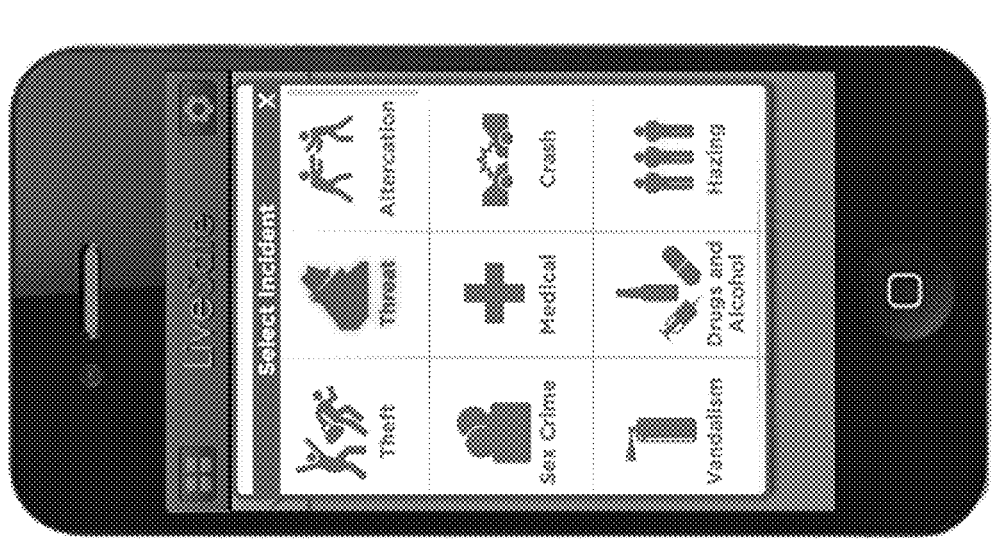

FIG. 6A shows a screen shot of one example of an alert report creation page. The alert report creation page may provide different incidents and allows the user to choose between different incidents and crimes. After selecting an incident, the next screen is shown in FIG. 6B. FIG. 6B shows a screen that allows a user to enter in descriptive alert information and begin to capture alert data associated with the alert report.

Figure 7B:
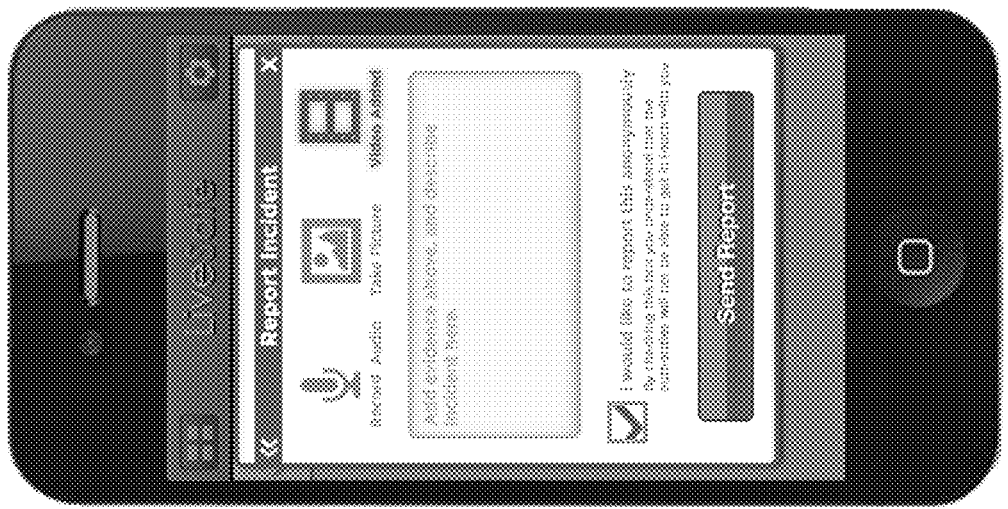
FIGS. 7A and 7B are screen shots illustrating a monitoring alert report screen and an update alert report screen, consistent with an embodiment.
Figure 7A:
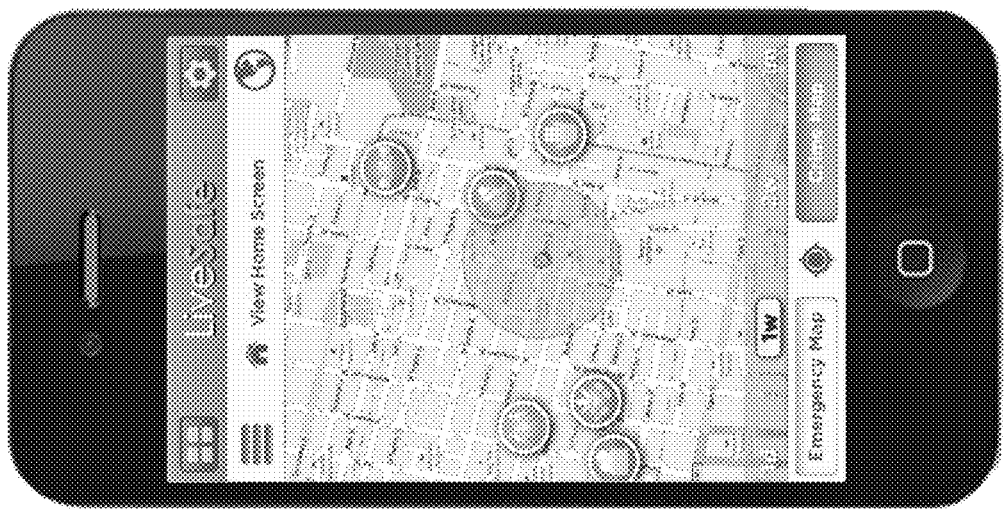

FIG. 7A shows a screen shot of one example of an alert report map screen for identifying current alert reports in the nearby geographic location. The current alert reports allow access to alert reporter information, alert information, and access to alert data so the user can view the data on their computer system. FIG. 7B shows a screen that allows a user to update descriptive alert information and begin to capture new alert data associated with the monitored alert report.

Accordingly, the mobile reporting systems and methods described herein may be used to allow users to create alerts and to update those alerts. The mobile reporting systems and methods advantageously allow users at remote geographic locations to identify other alerts and to monitor and/or update those alerts despite the geographic separation.

Embodiments of the methods described above may be implemented as software or a computer program product for use with a processing system or computer. Such implementation may include, without limitation, a series of computer instructions that embody all or part of the functionality described herein. The series of computer instructions may be stored in any tangible machine-readable medium, such as semiconductor, magnetic, optical or other memory devices, and may be transmitted using any communications technology, such as optical, infrared, microwave, or other transmission technologies. Such a computer program product may be distributed as a removable machine-readable medium (e.g., a diskette, CD-ROM), preloaded with a computer system (e.g., on system ROM or fixed disk), or distributed from a server or electronic bulletin board over the network (e.g., the Internet or World Wide Web). Alternative embodiments of the invention may be implemented as pre-programmed hardware elements or as a combination of hardware, software and/or firmware.

Those skilled in the art will recognize that this is one possible implementation of the functionality described herein. A mobile reporting system may also include other processes, procedures or functions in addition to or in place of the processes, procedures or functions described herein. These or process, procedures or functions may be executed by a processor on one computer or may be executed by processors on separate computers. The data may include other types of data in addition to or in place of the data described herein.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments show and described herein. Modifications and substitutions by one of ordinary skill in the art are considered to be within the scope of the present invention, which is not to be limited except by the following claims.

What is claimed is:

1. A computer-implemented method for mobile alert reporting and monitoring, the method comprising:
   displaying a create alert screen to a user via a user application on a user mobile computer system, the user application being configured to send alert reporter information and alert information associated with a new alert report from the user mobile computer system to a host computer system;
   sending the alert reporter information and alert information from the user mobile computer system to the host computer system, wherein the sent alert reporter information and alert information is associated with the new alert report;
   receiving, on the host computer system, an alert report from the user mobile computer system with alert reporter information and alert information provided by the user via the user application;
   storing the alert reporter information and alert information on the host computer system via an alert report database;
   displaying a capture alert data screen to the user via the user application, the user application being configured to send alert data from the user mobile computer system to the host computer system;
   sending the alert data captured by the user to the host computer system, wherein the sent alert data is associated with the new alert report;
   receiving, on the host computer system, the alert data from the user mobile computer system, wherein the sent alert data is associated with the new alert report;
   storing the alert data on the host computer system via the alert report database;
   providing access to the alert report database, wherein the user, via user application, can access the alert report; and
   providing access, via a report map, to the new alert report and providing access to the sent alert data associated with the new alert report, wherein the report map enables a plurality of alert reporters to contribute to the new alert report.

2. The method of claim 1, further comprising:
   displaying the new alert report;
   receiving, on the host computer system, a selection request selecting an alert reporter information, alert information or alert data to be displayed; and
   displaying an alert report selection page, the alert report selection page including the selected alert reporter information, alert information or alert data.

3. The method of claim 1, wherein the alert reporter information includes at least an alert reporter name and alert reporter contact information.

4. The method of claim 1, wherein the alert information includes at least an alert geographic location, a description, an emergency designation, and a time.

5. The method of claim 1, wherein the alert data includes at least a streaming video, a video clip, a picture, or an audio clip.

6. A computer-implemented method for mobile alert reporting and monitoring, the method comprising:
   providing access to an alert report map on a host computer system to be displayed on a user mobile computer system via a user application, wherein the alert report map enables a plurality of alert reporters to contribute to an alert report;
   displaying the alert report map to a user via the user application, allowing the user to select an alert report located on the alert report map;
   displaying an update alert screen to the user via the user application in response to selection of the alert report, the user application being configured to send alert reporter information and alert information associated with the alert report from the user mobile computer system to the host computer system;
   receiving, on the host computer system, an updated alert report from the user mobile computer system with updated alert reporter information and updated alert information provided by the user via the user application;
   storing an updated alert reporter information and updated alert information on the host computer system via an alert report database;
   displaying a capture alert data screen to the user via the user application, the user application being configured to send alert data from the user mobile computer system to the host computer system;
   sending the updated alert data captured by the user to the host computer system, wherein the sent updated alert data is associated with the alert report;
   receiving, on the host computer system, the updated alert data from the user mobile computer system to the host computer system, wherein the sent updated alert data is associated with the alert report; and
   storing the updated alert data on the host computer system via an alert report database.

7. The method of claim 6, further comprising:
   providing access to the alert report database, wherein the user, via user application, can access the sent alert report; and
   providing access, via the report map, to the alert report and providing access to the sent updated alert data associated with the alert report, wherein the report map enables a plurality of alert reporters to contribute to the alert report.

8. The method of claim 7, further comprising:
   displaying the alert report;
   receiving, on the host computer system, a selection request selecting an alert reporter information, alert information or alert data to be displayed; and
   displaying an alert report selection page, the alert report selection page including the selected alert reporter information, alert information or alert data.

9. The method of claim 6, further comprising:
receiving, on the host computer system, a send new alert data request from the user for sending alert data to be associated with the alert report; and
displaying a send alert data section, the send alert data section being configured to send alert data from the user mobile computer system to the host computer system.

10. A non-transitory, tangible computer readable medium comprising instructions stored thereon, which when executed by a computer, cause the computer to perform the following operations:
displaying a create alert screen to a user via a user application on a user mobile computer system, the user application being configured to send alert reporter information and alert information associated with a new alert report from the user mobile computer system to a host computer system;
sending the alert reporter information and alert information from the user mobile computer system to the host computer system, wherein the sent alert reporter information and alert information is associated with the new alert report;
displaying a capture alert data screen to the user via the user application, the user application being configured to send alert data from the user mobile computer system to the host computer system;
sending the alert data captured by the user to the host computer system, wherein the sent alert data is associated with the new alert report;
displaying an alert report map to a user via the user application;
allowing the user to select an alert report located on the alert report map; and
displaying an update alert screen to the user via the user application in response to selection of the alert report, the user application being configured to send alert reporter information and alert information associated with the alert report from the user mobile computer system to the host computer system.

* * * * *